(12) United States Patent
Arens et al.

(10) Patent No.: US 7,367,610 B2
(45) Date of Patent: May 6, 2008

(54) METHOD AND APPARATUS FOR ASSEMBLING A COMPONENT TO A PANEL

(75) Inventors: Ryan L. Arens, Farmington, MI (US); Scott A. Niemiec, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 410 days.

(21) Appl. No.: 10/893,758

(22) Filed: Jul. 16, 2004

(65) Prior Publication Data

US 2006/0010813 A1    Jan. 19, 2006

(51) Int. Cl.
*B62D 25/12* (2006.01)

(52) U.S. Cl. .................. 296/187.01; 52/511; 403/254; 403/316

(58) Field of Classification Search ............... 296/191, 296/29, 187.01; 52/511, 36.4, 512, 716.6; 403/254, 316
See application file for complete search history.

(56) References Cited

U.S. PATENT DOCUMENTS

| | | | | |
|---|---|---|---|---|
| 2,704,680 A | * | 3/1955 | Bedford, Jr. ................ 403/299 |
| 2,712,280 A | * | 7/1955 | Peoples ...................... 403/388 |
| 3,744,068 A | * | 7/1973 | Harris ............................ 5/181 |
| 3,757,361 A | * | 9/1973 | Harris et al. .................... 5/184 |
| 3,849,012 A | * | 11/1974 | Krouse ........................ 403/188 |
| 3,853,414 A | * | 12/1974 | Hirano et al. .................. 403/71 |
| 3,858,988 A | * | 1/1975 | Cohen .......................... 403/18 |
| 3,862,691 A | * | 1/1975 | Mori et al. .................. 211/191 |
| 4,012,686 A | * | 3/1977 | Heine .......................... 323/273 |
| 4,129,279 A | * | 12/1978 | Burkholder ................ 248/165 |
| 4,263,821 A | * | 4/1981 | Savage et al. ................ 74/595 |
| 4,266,386 A | * | 5/1981 | Bains ........................ 52/481.2 |
| 4,314,220 A | * | 2/1982 | Ito et al. ........................ 336/65 |
| 4,554,692 A | * | 11/1985 | Whitehead ...................... 5/411 |
| 4,560,130 A | * | 12/1985 | Schwartz ............... 248/297.21 |
| 4,713,739 A | * | 12/1987 | Ryder et al. ................. 362/424 |
| 4,753,560 A | * | 6/1988 | Ryder .......................... 411/82 |

(Continued)

FOREIGN PATENT DOCUMENTS

GB        2172045 A * 9/1986  ................. 403/316

(Continued)

OTHER PUBLICATIONS

Pictures of side-door impact sensor, installed on a GM full size pickup-up truck (Chevrolet Silverado/GMC Sierra) produced in summer 2004.

*Primary Examiner*—Christopher P. Ellis
*Assistant Examiner*—Paul A Chenevert

(57) ABSTRACT

A component is adapted for assembly to a panel at a desired location. The component includes a body and at least one fastener threadingly received in the body, the fastener having a head and a threaded shaft, the head extending outwardly from the body a predetermined distance and adapted to be received through an aperture in the panel. The head is adapted to temporarily hold the component on the panel before final assembly, and the threaded shaft is adapted to be driven by a tool which turns the shaft in a direction causing the head to draw toward the panel. A locating member is disposed on the body at a predetermined position and is adapted to couple with a complementary member disposed on the panel when the component is at the desired location.

28 Claims, 4 Drawing Sheets

U.S. PATENT DOCUMENTS

| | | | |
|---|---|---|---|
| 4,802,716 A * | 2/1989 | Rock et al. | 312/330.1 |
| 4,822,098 A * | 4/1989 | Vogt et al. | 296/146.5 |
| 4,955,743 A * | 9/1990 | King | 403/254 |
| 5,051,021 A * | 9/1991 | Pelz | 403/316 |
| 5,061,108 A * | 10/1991 | Bien et al. | 403/24 |
| 5,086,603 A * | 2/1992 | Graf et al. | 52/716.6 |
| 5,114,203 A * | 5/1992 | Carnes | 296/50 |
| 5,131,781 A * | 7/1992 | Klein | 403/254 |
| 5,143,331 A * | 9/1992 | Robert | 248/27.1 |
| 5,161,268 A * | 11/1992 | Harrow | 5/201 |
| 5,624,045 A * | 4/1997 | Highsmith et al. | 211/192 |
| 5,632,127 A * | 5/1997 | Agar et al. | 52/481.2 |
| 5,713,476 A * | 2/1998 | Highsmith et al. | 211/192 |
| 5,727,309 A * | 3/1998 | Schamberger | 29/622 |
| 5,791,502 A * | 8/1998 | Bietz et al. | 211/192 |
| 5,845,795 A * | 12/1998 | Mulholland | 211/192 |
| 5,938,367 A * | 8/1999 | Olson | 403/254 |
| 6,142,435 A * | 11/2000 | Lodi | 248/222.41 |
| 6,174,016 B1 * | 1/2001 | Ponziani | 296/56 |
| 6,193,198 B1 * | 2/2001 | Baur et al. | 248/222.41 |
| 6,203,234 B1 * | 3/2001 | Olson | 403/254 |
| 6,241,109 B1 * | 6/2001 | Kautz et al. | 211/192 |
| 6,286,919 B1 * | 9/2001 | Fleisch | 312/348.4 |
| 6,309,132 B1 * | 10/2001 | Jakob et al. | 403/200 |
| 6,325,337 B1 * | 12/2001 | Pedley et al. | 248/68.1 |
| 6,397,413 B2 * | 6/2002 | Epstein et al. | 5/201 |
| 6,415,465 B1 * | 7/2002 | Harrow | 5/201 |
| 6,443,320 B1 * | 9/2002 | Herzog et al. | 211/192 |
| 6,865,758 B2 * | 3/2005 | Harrow | 5/288 |
| 6,920,990 B2 * | 7/2005 | Krueger et al. | 211/183 |
| 6,925,666 B2 * | 8/2005 | Harrow | 5/201 |
| 7,188,892 B2 * | 3/2007 | Tazaki et al. | 296/193.09 |
| 2001/0045404 A1 * | 11/2001 | Pellegrino | 211/192 |
| 2005/0217052 A1 * | 10/2005 | Baskerville | 15/250.19 |
| 2006/0024146 A1 * | 2/2006 | Fink et al. | 411/103 |

FOREIGN PATENT DOCUMENTS

| | | | | |
|---|---|---|---|---|
| GB | | 2240375 A * | 7/1991 | 403/254 |

* cited by examiner

METHOD AND APPARATUS FOR ASSEMBLING A COMPONENT TO A PANEL

TECHNICAL FIELD

The present invention relates generally to assembly of a component to a panel, and more specifically to such an assembly which is temporarily a hands-free operation.

BACKGROUND OF THE INVENTION

Automotive original equipment manufacturers (OEMs) are continually improving quality at competitive cost and weight. Automotive assembly plants strive to improve productivity per production line worker in order to achieve a competitive edge. High speed production line rates may have cycle times of one minute or less. During each cycle, an operator may perform several tasks. Some of these tasks may include retrieving a part from a part bin/rack, retrieving appropriate fasteners from another part bin/rack, aligning and seating the part in the proper location, retrieving a fastening tool, and securing one or more fasteners to the proper torque. In addition, some or all of these tasks may be performed while the operator keeps pace with the vehicle as it moves along the assembly line.

Various drawbacks in performing these tasks may in some instances occur. For example, if the operator needs to hold the part in place while securing it, he/she may inadvertently drop the part while retrieving the fastening tool. In some cases, the dropped part may need to then be scrapped and replaced. Further, the operator may misalign the part while securing it to the vehicle. Another potential drawback is that it may become undesirably time consuming for the operator to choose between various fastening tools which may be necessary for various fasteners.

As such, it would be desirable to provide a component assembly which allows temporary hands free operation, aligns relatively easily, and may be secured by standard tools.

SUMMARY OF THE INVENTION

The present invention substantially solves the drawbacks enumerated above by providing a component adapted for assembly to a panel at a desired location. The component includes a body and at least one fastener threadingly received in the body, the fastener having a head and a threaded shaft, the head extending outwardly from the body a predetermined distance and adapted to be received through an aperture in the panel. The head is adapted to temporarily hold the component on the panel before final assembly, and the threaded shaft is adapted to be driven by a tool which turns the shaft in a direction causing the head to draw toward the panel. A locating member is disposed on the body at a predetermined position and is adapted to couple with a complementary member disposed on the panel when the component is at the desired location.

BRIEF DESCRIPTION OF THE DRAWINGS

Objects, features and advantages of embodiments of the present invention may become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DESCRIPTION OF THE PREFERRED EMBODIMENTS

The present inventors have fortuitously and unexpectedly discovered that embodiments of the present invention may reduce the effort required to assemble a component to a panel, thereby allowing the operator to perform this task quickly and accurately. This may advantageously contribute to improved productivity and quality, as well as reduced cost, due at least in part to less associated cost for fewer parts, and more efficient manufacturing. Although an embodiment of an automotive component and body panel is described herein, it is to be understood that embodiments of the present invention are not intended to be limited to automotive applications, nor to the specific automotive component/panel described.

Figure 1:
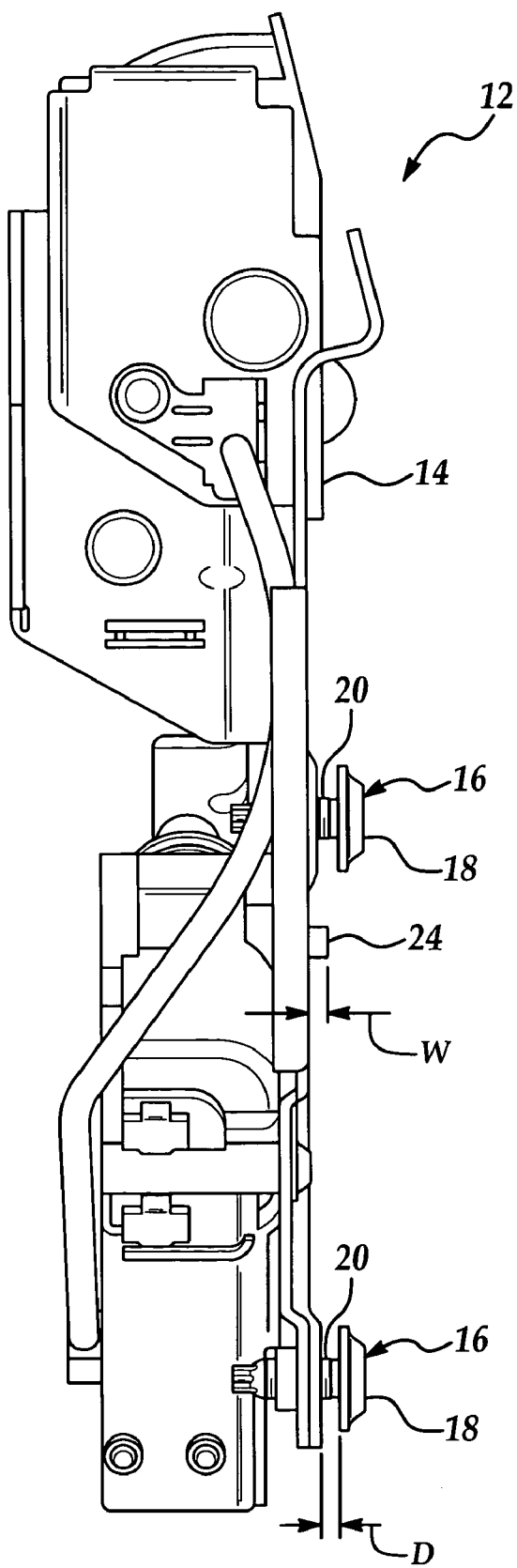
FIG. 1 is an enlarged side view of an embodiment of a component body, showing the fasteners extending outwardly therefrom.
Figure 2A:
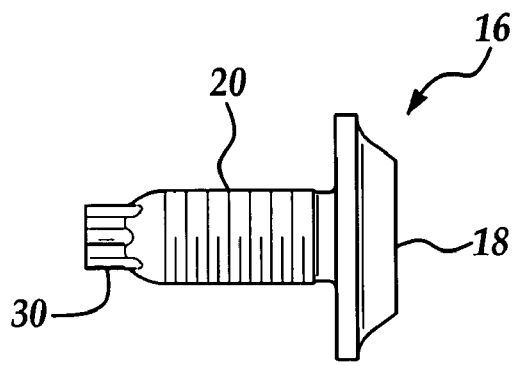
FIG. 2A is an enlarged side view of an embodiment of a threaded fastener.
Figure 2B:
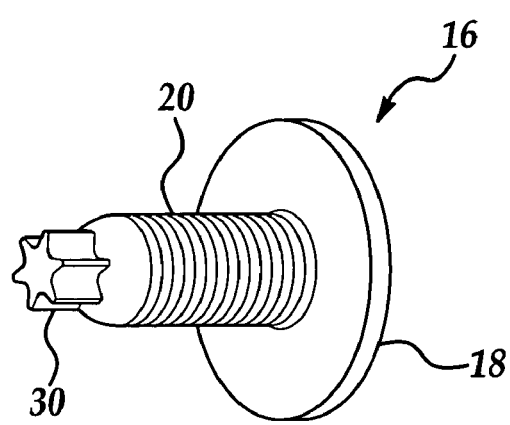
FIG. 2B is a perspective view of the fastener of FIG. 2A.
Figure 3:
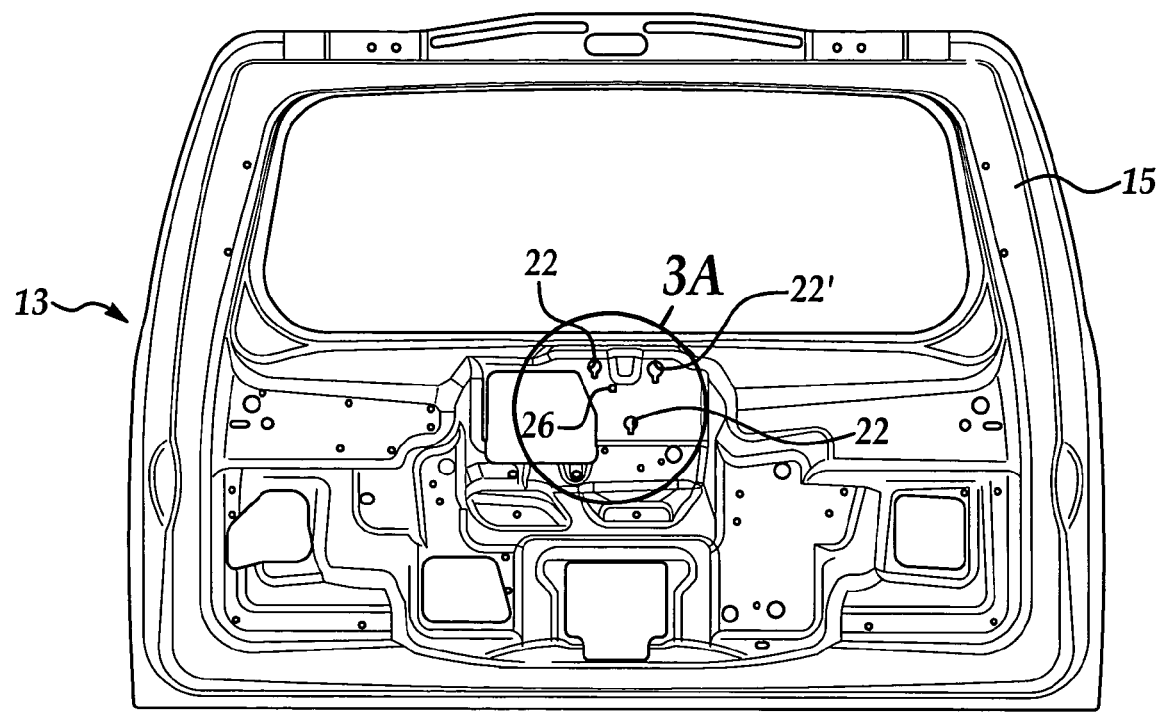
FIG. 3 is a front view of an embodiment of a panel as the operator would face the panel.
Figure 3A:
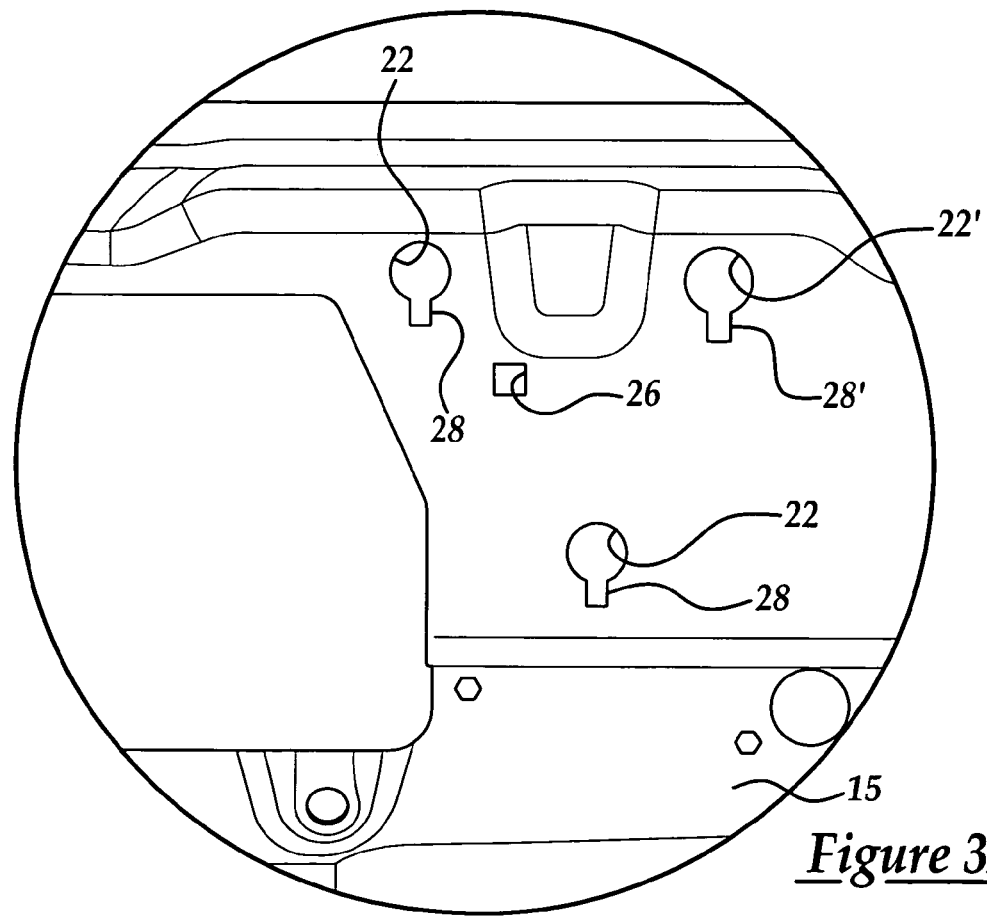
FIG. 3A is an enlarged view of the area of the panel at 3A in FIG. 3.

Referring now to FIGS. 1 through 3, a component 12 is shown, which is adapted for assembly to a panel 13 at a desired location (shown in FIG. 3A). The component 12 includes a body 14 and at least one fastener 16 threadingly received in the body 14. The fastener 16 has a head 18 and a threaded shaft 20. The head 18 extends outwardly from the body 14 a predetermined distance D and is adapted to be received through an aperture 22, 22' in the panel 13. The head(s) 18 are adapted to temporarily hold the component 12 on the panel 13 before final assembly. The threaded shaft 20, i.e. the end of shaft 20 that is distal to the head 18, is adapted to be driven by a tool (not shown) which turns the shaft 20 in a direction causing the head 18 to draw toward the panel 13.

It is to be understood that panel 13 may be formed from any suitable material, as desired and/or as suitable for a particular end use. Some non-limitative examples of suitable materials include metals, polymeric materials, wood, and/or the like, and/or mixtures thereof. In an embodiment, panel 13 is formed from sheetmetal.

It is to be understood that any suitable tool may be used, including but not limited to standard torque guns, air wrenches/tools, DC torque tools, and hand tools having a torque-indicating device.

The fastener 16 includes a torque transmitting-shaped member 30 defined at an end of the shaft 20 distal to the head 18, the torque transmitting-shaped member 30 being complementarily shaped with the tool. It is to be understood that any size, shape and/or configuration of the torque transmitting-shaped member 30 may be used as desired. Some non-limitative examples of member 30 include a male TORX head (as shown in FIG. 2B), a male square drive, a blade, a male hex head, a male star shaped head, and/or any suitable torque transmitting shape. It is to be further understood that the torque transmitting-shaped member 30 may be a female torque transmitting shape, and the drive member of the fastening tool would be the male shape. As such, some further non-limitative examples of member 30 include a female TORX head, a square drive, a slot drive, a female hex head, a female star shaped head, and/or any suitable torque transmitting shape.

The fasteners 16 may further optionally include selectively removable adhesive material(s) operatively disposed thereon to aid in maintaining fasteners 16 in the desired location/orientation on component 12 during shipment and handling and/or to aid in substantially preventing undesirable loosening of the fasteners 16 from the component/panel assembly 10.

The predetermined distance D the head 18 extends from the body 14 is generally measured from the surface of head 18 that is adjacent to shaft 20. It is to be understood that distance D may be any suitable distance sufficient to allow fastener head 18 to pass through aperture 22, 22' while providing a sufficient length of shaft 20 such that component 12 may hang temporarily on panel 13 via shaft(s) 20 within reduced width portion(s) 28, 28'. A non-limitative example of a suitable distance D is, for a minimum distance (while allowing for material thickness(es)), the locating member 24 width W from the adjacent component 12 face plus the installation clearance between the locating member 24 and the panel 13. Distance D may have any suitable maximum distance. In an embodiment, distance D is about 3.6 mm.

A locating member 24 is disposed on the body 14 at a predetermined position and is adapted to couple with a complementary member 26 disposed on the panel 13 when the component 12 is at the desired location (e.g. fully seated in apertures 22, 22' and locating member 24 coupled with complementary member 26). It is to be understood that the locating member 24 may optionally be disposed on the panel 13, with the complementary member 26 on the component body 14.

Figure 5:
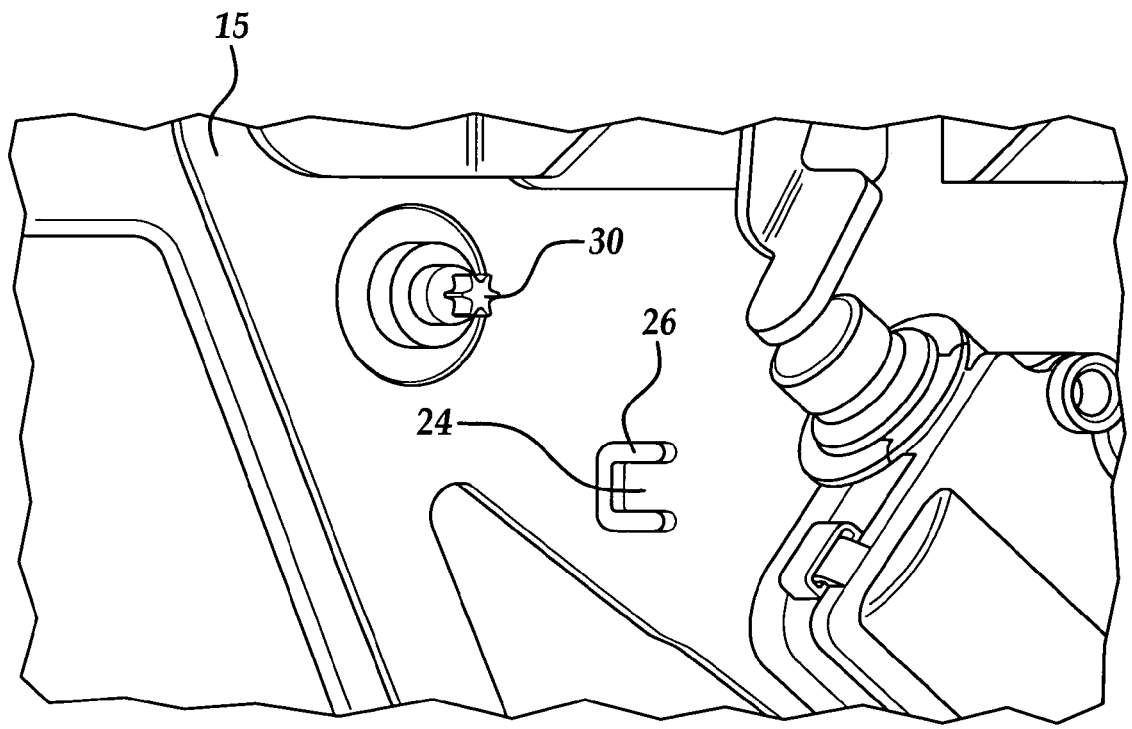
FIG. 5 is an enlarged cutaway perspective view showing an embodiment of a locating member coupled with a complementary member, and also showing an embodiment of a torque transmitting-shaped member defined at an end of a fastener shaft distal to the fastener head.

In an embodiment, the locating member 24 is a tab extending outwardly from the component body 14 (as seen in FIG. 1), and the complementary member 26 is a slot (as seen in FIG. 3A) defined in the panel 13 and adapted to receive the tab 24. An embodiment of tab 24 coupled within slot 26 is shown in FIG. 5. Tab 24 and slot 26 may be advantageous in that they are self-locating, thereby substantially reducing probability of operator error in properly aligning the component 12 on the panel 13. In an alternate embodiment, the locating member 24 may be a "window", and the complementary member 26 may be some type of indicia which, when it appears in the "window," indicates to the operator that the part is properly aligned/seated.

It is to be understood that the apertures 22, 22' may be of any desired number, size, shape and/or configuration. In an embodiment, aperture 22' is slightly larger than apertures 22. The fastener heads 18 are sized to fit through the respective apertures 22, 22'. This aperture size differential may advantageously serve as an additional way (or primary way, as the locating member 24/complementary member 26 may be optional, and one or more of the fasteners 16/apertures 22, 22' may form the locating member 24/complementary member 26) of correctly locating the component 12 in the desired location. Further, it is to be understood that all the apertures 22, 22' may be substantially the same size, or may each be of a different size from each other, with respective fastener heads 18 being of a size complementary to the apertures 22, 22'.

In an embodiment, apertures 22, 22' include a reduced width portion 28, 28' at any desired location on apertures 22, 22'. One non-limitative example of a suitable aperture 22, 22' configuration is a key slot configuration. It is to be further understood that the aperture 22, 22' configuration, for example the key slot configuration of apertures 22, 22', may be in any desired orientation in the panel 13. For example, any or all of the apertures 22, 22' may be pierced in the panel 13 in an orientation which is rotated about 90° from the orientation shown in FIG. 3A.

Figure 4:
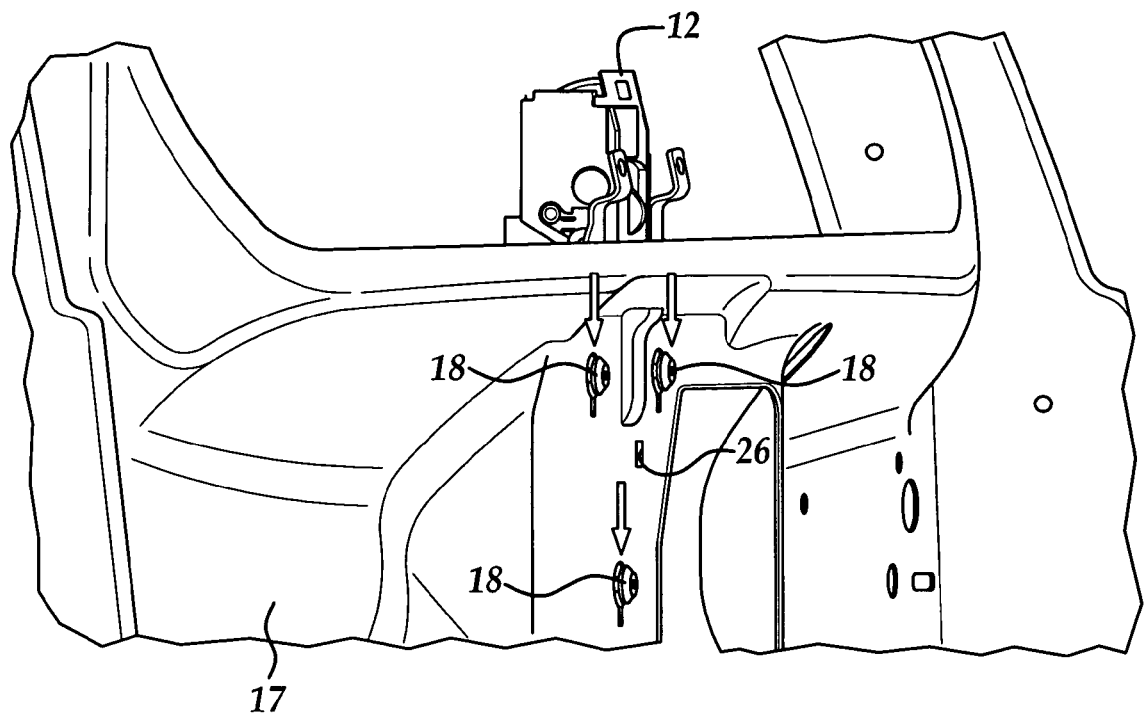
FIG. 4 is a cutaway perspective view of the back of the panel of FIG. 3, but showing an embodiment of component fasteners initially received in apertures in the panel.

FIG. 4 shows the back side 17 of panel 13 (as used herein, the "back" 17 of panel 13 refers to the side that is away from the operator, while the "front" 15 of panel 13 refers to the side that faces the operator during assembly); and further shows fastener heads 18 initially received within apertures 22, 22'. After heads 18 are in the position shown, the operator urges the component 12 downward (as shown by the directional arrows) so that the fastener shafts 20 are received in the reduced width portions 28, 28'. It is to be understood that if the apertures 22, 22' are oriented 90° from the orientation shown in FIG. 3A, the operator would urge component 12 sideways such that the fastener shafts 20 are received into the reduced width portions 28, 28'. As such, it is to be understood that the operator will urge component 12 in any suitable direction, depending upon the orientation of apertures 22, 22', such that the fastener shafts 20 are received within the reduced width portions 28, 28'. The reduced width portions 28, 28' have a width less than the width of the respective head to be received through the apertures 22, 22'. As such, the reduced width portions 28, 28' substantially prevent the heads 18 from dislodging from the apertures 22, 22' during the assembly of the component 12 to the panel 13.

In an embodiment, reduced width portion 28' is slightly larger than reduced width portions 28. The fastener shafts 20 are sized to operatively fit within the respective reduced width portions 28, 28'. This reduced width portion 28, 28' size differential may also advantageously serve as an additional/primary way of correctly locating the component 12 in the desired location. Further, it is to be understood that all the reduced width portions 28, 28' may be substantially the same size, or may each be of a different size from each other, with respective shafts 20 being of a size complementary to the reduced width portions 28, 28'.

It is to be understood that any number, size and/or shape of fasteners 16 may be used and in any configuration as desired. In an embodiment, three fasteners 16 are spaced in a desired configuration, for example, the substantially triangular configuration as seen in FIG. 4. Complementary to the configuration of this embodiment, the panel 13 has three corresponding key slot apertures 22, 22' spaced in a substantially triangular configuration. This substantially triangular configuration may be advantageous in that this configuration aids in properly locating the component on to the panel in three orientations: primary: fore/aft; secondary: up/down; and thirdly: cross-car. This substantially triangular configuration may also aid in desirable load distribution.

In an alternate embodiment (not shown), the fastener(s) 16 are threadingly engaged in, and extending outwardly a predetermined distance from the panel 13; and corresponding apertures 22, 22' are defined in the component 12. In this embodiment, threaded shaft 20, i.e. the end of shaft 20 that is distal to the head 18, is adapted to be driven by a tool which turns the shaft 20 in a direction causing the head 18 to draw toward the component 12.

It is contemplated as being within the purview of embodiments of the present invention that shafts 20 may have any kinds of threads defined therein such that when the fastening tool drives the shaft 20 as described herein, the head 18 will be drawn toward the panel 13 (if the apertures 22, 22' are defined in the panel 13) or the component body 14 (if the apertures 22, 22' are defined in the component body 14).

Figure 6:
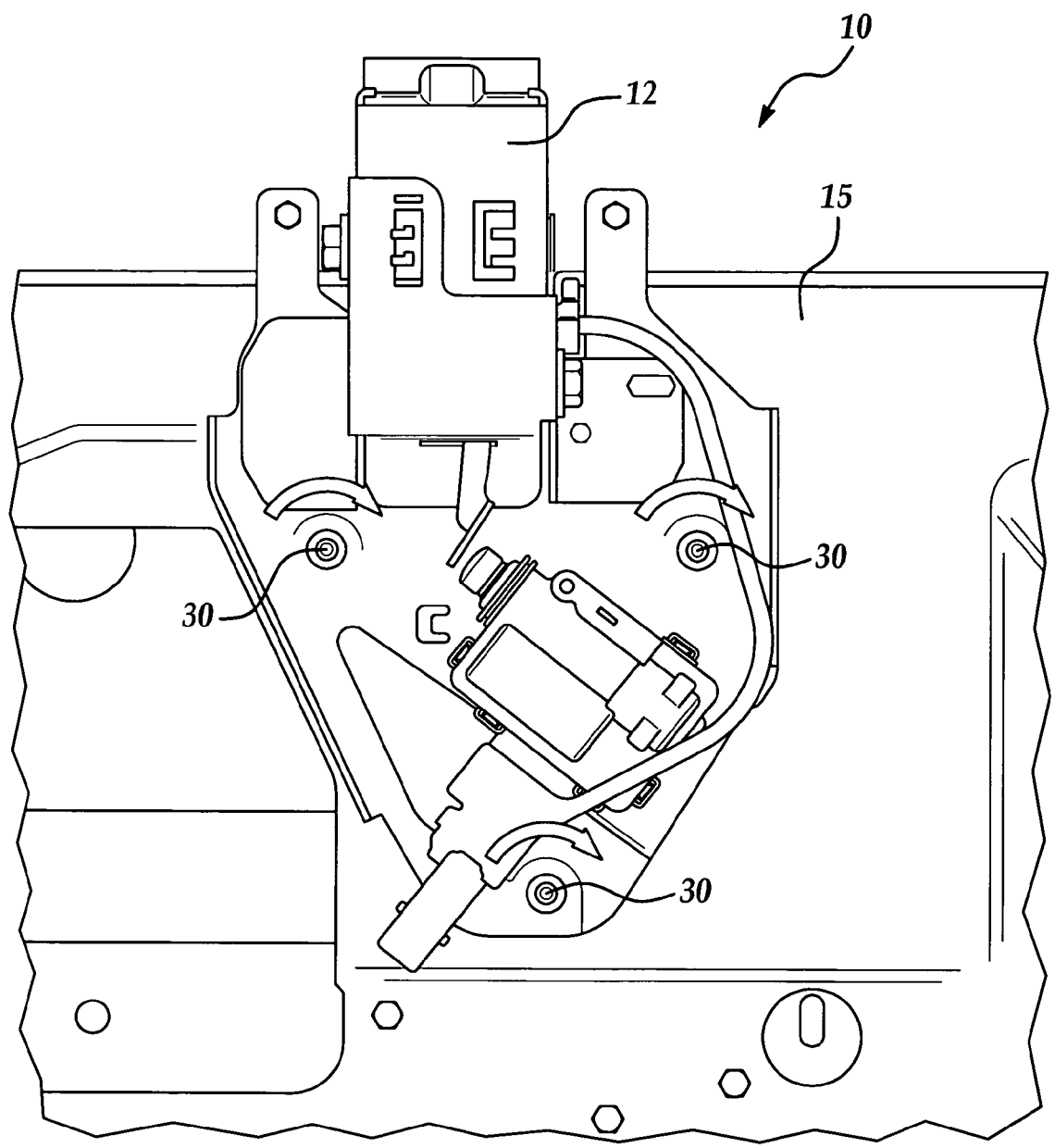
FIG. 6 is an enlarged cutaway front view showing an embodiment of the component fully assembled to the panel.

In an embodiment of the present invention as shown in FIG. 6, the shafts 20 have left hand threads defined therein. The torque transmitting-shaped members 30 (e.g. male TORX head members) of the fasteners 16 face the operator, extending outwardly away from the component 12 and the front side 15 of panel 13. In this embodiment, when the operator applies a standard torque gun adapted for driving right hand threaded fasteners to the torque transmitting-shaped members 30, the shafts 20 will rotate clockwise (shown by the directional arrows), thereby drawing the heads 18 (on the back side 17 of panel 13) toward the panel 13.

In one non-limitative embodiment, the component 12 is a latch assembly, and the panel 13 is an automotive body panel. In a further non-limitative embodiment as shown in the Figures, the latch assembly is a lift-glass latch assembly, and the automotive body panel is a tailgate and/or a lift gate.

An embodiment of a method of assembling a component 12 to a panel 13 at a desired location includes temporarily coupling the component 12 to the panel 13 by inserting the fastener(s) 16 into an aperture 22, 22'. The head(s) 18 extend outwardly from the body 14 a predetermined distance D and through the aperture(s) 22, 22' to temporarily hold the component on the panel 13 before final assembly. The operator may then optionally couple locating member 24 with complementary member 26 if further verification (that component 12 is accurately aligned and substantially fully seated) is desired.

At this point, with the component 12 temporarily coupled to the panel 13, the operator's hands are free to retrieve the fastening tool (and perform other tasks, as desired). Alternatively, the operator may keep the fastening tool in one hand, and retrieve and temporarily couple the component 12 with the other hand. In the embodiment as shown in FIG. 6, the operator may use a standard torque gun, which may be advantageous by obviating the need for selection between various and/or specialized tools (for example, tools having a modified drive/rotation direction. Upon application of the standard torque gun on the torx-head member 30, the left hand threaded shafts rotate clockwise, and may be secured to the panel 13 at a specified torque, completing the component/panel assembly 10.

Embodiments of the present invention offer many advantages, some of which are as follows. The component/panel assembly 10 embodiments obviate the need for additional parts, such as loose fasteners, weldnuts and/or reinforcements (e.g. for liftglass latch reinforcement). Fewer parts may generally lead to reduced weight, which in turn may lead to better fuel economy. Further, in some instances, it may be preferable to manufacture a panel with a punched aperture(s) than to install weldnuts. This may advantageously simplify the manufacturing process of the vehicle, potentially leading to reduced component and assembly costs. Still further, the temporary "hands-free" assembly as described herein may be even more advantageous in certain instances. For example, in the non-limitative embodiment wherein the component 12 is a liftglass latch assembly for attachment to a liftgate body panel 13, the liftgate may be opening and above the head of the operator during assembly of the liftglass latch. The operator may slide the liftglass latch onto the "keyhole" slots on the front panel 15 (and the latch will remain). The operator is then able to retrieve the required tooling to tighten the fasteners.

While several embodiments of the invention have been described in detail, it will be apparent to those skilled in the art that the disclosed embodiments may be modified. Therefore, the foregoing description is to be considered exemplary rather than limiting.

The invention claimed is:

1. An automotive component adapted for hands-free assembly to an automotive body panel at a desired installed location, the component comprising:
   a body;
   at least three fasteners threadingly received in the body, each of the fasteners having a head and a threaded shaft, the head extending outwardly from the body a predetermined distance and adapted to be received through an aperture in the automotive body panel, the head adapted to temporarily hold the automotive component on the automotive body panel before final assembly, the threaded shaft adapted to be driven by a tool which turns the shaft in a direction causing the head to draw toward the automotive body panel; and
   a locating tab having a substantially rectangular cross-sectional shape, disposed on the body at a predetermined position, and adapted to couple with a complementary slot having a substantially rectangular cross-sectional shape, defined in the automotive body panel, when the automotive component is at the desired installed location, thereby aligning the automotive component with the automotive body panel at the desired installed location, wherein the locating tab extends outwardly from the automotive component body, and wherein the complementary slot is adapted to receive the tab.

2. The automotive component as defined in claim 1 wherein the fastener comprises a torque transmitting-shaped member defined at an end of the shaft distal to the head, the torque transmitting-shaped member being complementarily shaped with the tool.

3. The automotive component as defined in claim 1 wherein the locating tab is a portion of the body, bent such that the locating tab extends outwardly from the body.

4. The automotive component as defined in claim 1 wherein the aperture is a key slot having a reduced width portion, and wherein the shaft is adapted to be received in the reduced width portion, the reduced width portion having a width less than a width of the head and adapted to substantially prevent the head from dislodging from the aperture during the assembly.

5. The automotive component as defined in claim 4 wherein the at least three fasteners comprise three fasteners spaced in a desired configuration, and wherein the aperture comprises three key slot apertures spaced in a configuration complementary to the fastener desired configuration.

6. The automotive component as defined in claim 5 wherein the shafts have left hand threads defined therein and wherein the tool is adapted for driving right hand threaded fasteners.

7. The automotive component as defined in claim 6 wherein the automotive component is a latch assembly.

8. An automotive component and automotive body panel assembly, comprising:
   a component body;

at least three fasteners threadingly received in one of the body and the automotive body panel, each of the fasteners having a head and a threaded shaft, the head extending outwardly from the one of the body and the automotive body panel a predetermined distance and received through an aperture in the other of the automotive body panel and the body, the head adapted to temporarily hold the automotive component on the automotive body panel for hands-free assembly of the automotive component to the automotive body panel, the threaded shaft adapted to be driven by a tool which turns the shaft in a direction causing the head to draw toward the other of the automotive body panel and the body; and a locating tab having a substantially rectangular cross-sectional shape, disposed on one of the body and the automotive body panel at a predetermined position, and coupled with a complementary slot having a substantially rectangular cross-sectional shape, defined in the other of the automotive body panel and the body when the automotive component is at a desired installed location thereby aligning the automotive component with the automotive body panel at the desired installed location, wherein the locating tab extends outwardly from one of the automotive component body and the automotive body panel, and wherein the complementary slot is adapted to receive the tab.

9. The automotive component and automotive body panel assembly as defined in claim 8 wherein the locating tab is a portion of the one of the body and the automotive body panel, bent such that the locating tab extends outwardly from the one of the body and the automotive body panel.

10. The automotive component and automotive body panel assembly as defined in claim 8 wherein the fastener comprises a torque transmitting-shaped member defined at an end of the shaft distal to the head.

11. The automotive component and automotive body panel assembly as defined in claim 10 wherein the aperture is a key slot having a reduced width portion, and wherein the shaft is received in the reduced width portion, while the reduced width portion substantially prevents the head from dislodging from the aperture during the assembly.

12. The automotive component and automotive body panel assembly as defined in claim 11 wherein the at least three fasteners comprise three fasteners spaced in a desired configuration, and wherein the aperture comprises three key slot apertures spaced in a configuration complementary to the fastener desired configuration.

13. The automotive component and automotive body panel assembly as defined in claim 12 wherein the component is a latch assembly.

14. The automotive component and automotive body panel assembly as defined in claim 12 wherein the shafts have left hand threads defined therein and wherein the tool is adapted for driving right hand threaded fasteners.

15. A method of assembling an automotive component to an automotive body panel at a desired installed location, the method comprising:

temporarily coupling the automotive component to the automotive body panel by inserting at least three fasteners into an aperture in the automotive body panel, each fastener threadingly received in the automotive component and having a head and a threaded shaft, the head extending outwardly from the automotive component a predetermined distance and through the aperture to temporarily hold the automotive component on the automotive body panel for hands-free final assembly;

coupling a locating tab having a substantially rectangular cross-sectional shape and disposed on the automotive component, with a complementary slot having a substantially rectangular cross-sectional shape and defined in the automotive body panel, the locating tab adapted to couple with the complementary slot when the automotive component is at the desired installed location thereby aligning the automotive component with the automotive body panel at the desired installed location, wherein the locating tab extends outwardly from the automotive component, and wherein the complementary slot is adapted to receive the tab; and driving an end of the threaded shaft distal to the head with a tool which turns the shaft in a direction causing the head to draw toward the automotive body panel.

16. The method as defined in claim 15 wherein the aperture is a key slot having a reduced width portion, and wherein the method further comprises urging the shaft into the reduced width portion after the head has passed through the aperture, the reduced width portion having a width less than a width of the head.

17. The method as defined in claim 15 wherein the at least three fasteners comprise three fasteners spaced in a desired configuration, and wherein the aperture comprises three apertures spaced in a configuration complementary to the fastener desired configuration.

18. The method as defined in claim 15 wherein the automotive component is a latch assembly.

19. The method as defined in claim 15 wherein the shaft has left hand threads defined therein and wherein the tool is adapted for driving right hand threaded fasteners.

20. The method as defined in claim 19 wherein the fastener comprises a torque transmitting-shaped member defined at the end of the shaft distal to the head, the torque transmitting-shaped member being complementarily shaped with the tool.

21. A method of assembling an automotive component to an automotive body panel at a desired installed location, the method comprising:

temporarily coupling the automotive component to the automotive body panel by inserting at least three fasteners into respective apertures in the automotive body panel, each of the fasteners threadingly received in the automotive component and having a head and a threaded shaft, the head extending outwardly from the automotive component a predetermined distance and through the respective aperture to temporarily hold the automotive component on the automotive body panel for hands-free final assembly;

coupling a locating tab having a substantially rectangular cross-sectional shape, with a complementary slot having a substantially rectangular cross-sectional shape, wherein the locating tab extends outwardly from one of the automotive component and the automotive body panel, and wherein the complementary slot is adapted to receive the tab and is defined in the other of the automotive body panel and the automotive component, the locating tab adapted to couple with the complementary slot when the automotive component is at the desired installed location thereby aligning the automotive component with the automotive body panel at the desired installed location; and driving an end of the threaded shaft distal to the head with a tool which turns the shaft in a direction causing the head to draw toward the automotive body panel.

22. The method as defined in claim 21 wherein the locating tab is a portion of the one of the automotive component and the automotive body panel, bent such that the locating tab extends outwardly from the one of the automotive component and the automotive body panel.

23. A method of attaching a latch assembly to an automotive body panel at a desired installed location, the method comprising:
   temporarily coupling the latch assembly to the automotive body panel by inserting three fasteners spaced in a desired configuration into three respective key slot apertures spaced in a configuration complementary to the fastener desired configuration, the three apertures each having a reduced width portion and defined in the automotive body panel, the fasteners threadingly received in the latch assembly body and each having a head and a threaded shaft, the heads extending outwardly from the latch assembly body a predetermined distance and through the apertures to temporarily hold the latch assembly on the automotive body panel for hands-free final attaching;
   urging the shafts into the respective reduced width portions after the heads have passed through the apertures, the reduced width portions each having a width less than a width of the respective head;
   coupling a locating member tab having a substantially rectangular cross-sectional shape and disposed on the latch assembly body, with a complementary member slot having a substantially rectangular cross-sectional shape and disposed on the automotive body panel, the locating member tab adapted to couple with the complementary member slot when the component is at the desired installed location thereby aligning the latch assembly with the automotive body panel at the desired installed location; and
   driving an end of each of the threaded shafts distal to each of the heads with a tool which turns the shafts in a direction causing the heads to draw toward the automotive body panel.

24. The method as defined in claim 23 wherein the latch assembly is a lift-glass latch assembly, and wherein the automotive body panel is at least one of a tailgate and a lift gate.

25. The method as defined in claim 23 wherein the locating tab is a portion of the latch assembly body, bent such that the locating tab extends outwardly from the latch assembly body.

26. The method as defined in claim 23 wherein each of the shafts has left hand threads defined therein and wherein the tool is adapted for driving right hand threaded fasteners.

27. The method as defined in claim 26 wherein each of the fasteners comprises a torque transmitting-shaped member defined at the end of the shaft distal to the head, the torque transmitting-shaped member being complementarily shaped with the tool.

28. A method of assembling an automotive component to an automotive body panel at a desired installed location, the method consisting essentially of:
   temporarily coupling the automotive component to the automotive body panel by inserting at least three fasteners into an aperture in the automotive body panel, each fastener threadingly received in the automotive component and having a head and a threaded shaft, the head extending outwardly from the automotive component a predetermined distance and through the aperture to temporarily hold the automotive component on the automotive body panel for hands-free final assembly;
   coupling a locating tab having a substantially rectangular cross-sectional shape and disposed on one of the automotive component and the automotive body panel, with a complementary slot having a substantially rectangular cross-sectional shape and defined in the other of the automotive body panel and the automotive component, the locating tab adapted to couple with the complementary slot when the automotive component is at the desired installed location, wherein the locating tab extends outwardly from one of the automotive component and the automotive body panel, and wherein the complementary slot is adapted to receive the tab; and
   driving an end of the threaded shaft distal to the head with a tool which turns the shaft in a direction causing the head to draw toward the automotive body panel.

* * * * *